Patented Sept. 18, 1951

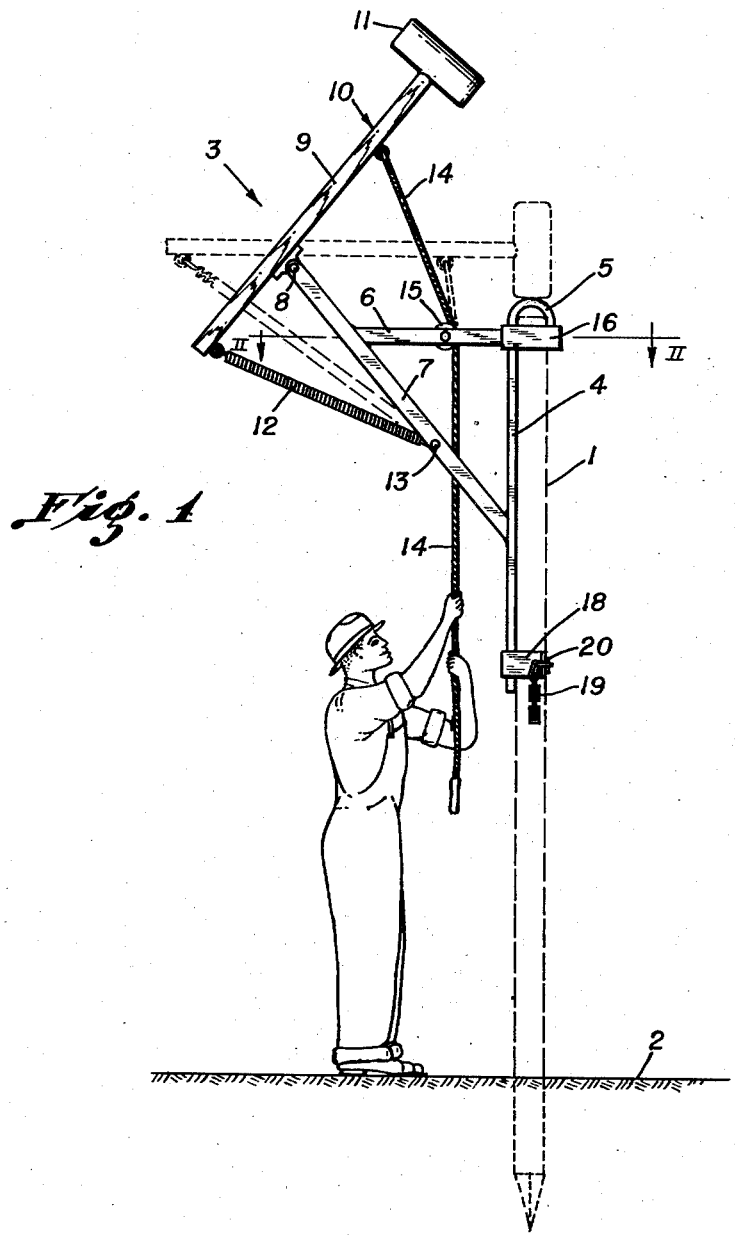
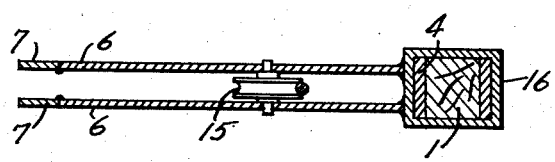
*Fig. 1*
*Fig. 2*
INVENTOR.
ADRIANO DASO

2,568,613

UNITED STATES PATENT OFFICE 2,568,613

STAKE DRIVER

Adriano Daso, Arroyo Grande, Calif.

Application May 27, 1946, Serial No. 672,530

4 Claims. (Cl. 61—73)

This invention relates to devices for driving stakes and the like, and is particularly designed for driving stakes of such lengths that they cannot be driven with a hand maul by a man standing on the ground.

An object of the invention is to provide an apparatus of portable nature that can be handled by one man for driving stakes of length too great to be driven by a man standing on the ground with the conventional maul.

A more specific object is to provide a stake driving mechanism that can be mounted upon and supported by a stake that is to be driven by a man standing on the ground.

Other more specific objects and features of the invention will become apparent from the description to follow of a particular embodiment thereof with reference to the drawing, in which:

Fig. 1 is an elevation view showing a device in accordance with the invention mounted upon a stake that is being driven thereby, and Fig. 2 is a horizontal section taken in the plane II—II of Fig. 1.

Referring to the drawing, there is shown a stake 1 which has been started in the ground 2 and is being driven into the ground by a mechanism 3 in accordance with the invention, the mechanism being actuated by a man standing on the ground alongside the stake.

The mechanism comprises a frame having a vertical member 4 which lies alongside the stake 1 that is to be driven and is bent over in the form of a crook, or gooseneck 5 at the upper end to engage with the upper end of the stake. A horizontal frame member 6 extends outwardly from the vertical member 4 adjacent the upper end thereof, and connects at its outer end to an angle member 7. The lower end of the angle member 7 connects to the vertical member 4. The upper end of the member 7 extends beyond its point of attachment to the horizontal member 6 and is pivotally connected by a rivet 8 to the handle 9 of a maul 10 having a head 11.

The maul 10 is normally in the elevated position shown in full lines in the drawing and is yieldably retained in this position by a tension spring 12 which is connected between the outer end of the handle 9 and a pin 13 in the angle member 7. However, a rope 14 is connected to the handle 9 of the maul between the hinge point 8 and the maul head 11. This rope extends down over a pulley 15 secured to the horizontal member 6, and is adapted to be grasped by a workman. By periodically pulling and releasing the rope 14, the maul 10 can be swung or oscillated back and forth in an arc to drive the stake 1 into the ground.

The horizontal frame member 6 preferably comprises two parallel strips that are separated from each other so that the pulley 15 is positioned in between them. The angle member 7 can be similarly formed, and the rope 14 can pass down between the two strips constituting the angle member.

The various parts 4, 6 and 7 can be welded together where they join. A strap 16 is preferably extended around the vertical member 4 and the tip of the gooseneck 5 thereon, to provide an enclosure encircling the upper end of the stake 1 and preventing the member 4 from slipping sidewise off the stake.

The lower end of the vertical member 4 is preferably releasably connected to the stake 1 in some way. To this end, there is shown attached to the lower end of the member 4 a U-shaped member 18 which is adapted to receive the stake 1. The open end of this U-shaped member is on the opposite side of the stake from the vertical member 4, and the member 18 can be secured with respect to the stake by a chain 19, the links of which are adapted to be received in a slot 20 in an outwardly extending end of one of the legs constituting the U member 18.

The operation of the device is believed to be obvious from the previous description and the drawing. A stake to be driven has the mechanism attached thereto by first placing the upper end of the stake 1 within the strap 16, after which the lower end of the vertical member 4 is secured to the stake by means of the chain 19. The operator then lifts the stake into a vertical position with its point resting on the ground, and steadies the stake in vertical position with one hand while he pulls and releases the rope 14 with the other hand to thereby manipulate the maul 10 and start the stake into the ground. As soon as the stake has been driven into the ground far enough to retain itself in vertical position, the operator can use both hands to pull on the rope 14.

The invention is particularly useful for driving long stakes or posts in fields. For instance, in some fields where crops such as peas are grown, it is necessary to drive a large number of stakes which may be eight or ten feet tall. Heretofore, it has been necessary to drive a truck or other vehicle having a high platform through the field to enable an operator to drive the stakes with an ordinary hand maul. The present invention eliminates the need of using any portable platform for the purpose of driving these stakes.

Although for the purpose of explaining the invention, a specific embodiment thereof has been described in considerable detail, various changes from the exact construction shown will be apparent to those skilled in the art and the invention is to be limited only to the extent set forth in the appended claims.

I claim:

1. A device of the type described for driving an approximately vertically positioned stake downwardly into the ground comprising: a frame; upper and lower stake-engaging members rigidly connected to said frame for supporting it, said upper member comprising first collar means for encircling the stake and laterally supporting the frame with respect to the stake, and cap means extending across the collar means thereabove for engaging the upper end of the stake encircled by the collar means and applying the weight of the device to the stake, said lower stake-engaging member comprising second collar means aligned with said first collar means and spaced therebelow for encircling the stake and laterally supporting the frame with respect to the stake; hammer means oscillatably mounted upon said frame for oscillation about an axis in offset relation with respect to the axis of alignment of said first and second collars, and against said cap means to thereby apply driving impact through said cap means to the upper end of a stake supporting said cap means; and means for oscillating said driving means.

2. A device according to claim 1 including spring means connected between said frame and said hammer means for normally retracting said hammer means away from said cap means, and manually actuable means connected to said hammer means for oscillating the latter toward said cap means.

3. A device according to claim 2 in which said manually actuable means comprises a rope secured to said hammer means and depending downwardly therefrom whereby it can be pulled by an operator positioned below said device.

4. A device according to claim 1 in which said second collar means comprises a U-shaped member dimensioned to clasp the stake, and means for locking said U-shaped member in clasping relation with a stake.

ADRIANO DASO.

REFERENCES CITED

The following references are of record in the file of this patent:

UNITED STATES PATENTS

| Number | Name | Date |
| --- | --- | --- |
| 52,811 | Anderson | Feb. 27, 1866 |
| 80,600 | Clark | Aug. 4, 1868 |
| 281,719 | Parsons | July 24, 1883 |
| 363,706 | Welsh | May 24, 1887 |
| 665,364 | Engstrom | Jan. 1, 1901 |
| 1,046,662 | Simonson | Dec. 10, 1912 |
| 1,482,310 | Lodato | Jan. 29, 1924 |
| 2,067,890 | Collord | Jan. 19, 1937 |
| 2,086,213 | Collord | July 6, 1937 |
| 2,098,146 | Hunt | Nov. 2, 1937 |
| 2,282,049 | Haggart, Jr. | May 5, 1942 |